(12) United States Patent
Shibuya et al.

(10) Patent No.: US 11,074,698 B2
(45) Date of Patent: Jul. 27, 2021

(54) OBJECT TRACKING DEVICE AND OBJECT TRACKING METHOD

(71) Applicant: Mitsubishi Electric Corporation, Tokyo (JP)

(72) Inventors: Naohiro Shibuya, Tokyo (JP); Yoshimi Moriya, Tokyo (JP); Kazuo Sugimoto, Tokyo (JP); Akira Minezawa, Tokyo (JP); Mengxiong Wang, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 16/483,074

(22) PCT Filed: Mar. 6, 2017

(86) PCT No.: PCT/JP2017/008768
§ 371 (c)(1),
(2) Date: Aug. 2, 2019

(87) PCT Pub. No.: WO2018/163243
PCT Pub. Date: Sep. 13, 2018

(65) Prior Publication Data
US 2020/0013172 A1 Jan. 9, 2020

(51) Int. Cl.
*G06T 7/246* (2017.01)
*G06T 7/73* (2017.01)
(Continued)

(52) U.S. Cl.
CPC .......... *G06T 7/246* (2017.01); *G06K 9/6215* (2013.01); *G06T 7/74* (2017.01); *G06T 7/97* (2017.01)

(58) Field of Classification Search
CPC .. G06T 7/246; G06T 7/74; G06T 7/97; G06T 7/20; G06T 7/285; G06K 9/6215; G06K 9/00771
See application file for complete search history.

(56) References Cited

U.S. PATENT DOCUMENTS

| 2007/0013791 A1 | 1/2007 | Kinoshita et al. |
| 2009/0220123 A1* | 9/2009 | Tojo .................. G06K 9/00771 382/103 |

(Continued)

FOREIGN PATENT DOCUMENTS

| JP | 11-341339 A | 12/1999 |
| JP | 2007-42072 A | 2/2007 |

(Continued)

OTHER PUBLICATIONS

Dalal et al. "Histograms of Oriented Gradients for Human Detection", In CVPR, 2005, total 8 pages.

(Continued)

*Primary Examiner* — Matthew C Bella
*Assistant Examiner* — Kaleb Tessema
(74) *Attorney, Agent, or Firm* — Birch, Stewart, Kolasch & Birch, LLP (57) ABSTRACT

A congestion degree estimating unit (12) which estimates, for each image frame, a congestion degree of an area in which each object detected by an object detecting unit (11) is present is provided. An object selecting unit (13) refers to an estimation result of the congestion degree by the congestion degree estimating unit (12) for each image frame, and selects an object present in an area the congestion degree of which is equal to or lower than a first threshold out of one or more objects detected by the object detecting unit (11).

5 Claims, 8 Drawing Sheets

(51) Int. Cl.
*G06T 7/00* (2017.01)
*G06K 9/62* (2006.01)

(56) References Cited

U.S. PATENT DOCUMENTS

| | | |
|---|---|---|
| 2010/0296702 A1 | 11/2010 | Hu |
| 2012/0274855 A1* | 11/2012 | Aokage .................. H04N 5/21 |
| | | 348/607 |
| 2013/0006991 A1 | 1/2013 | Nagano et al. |
| 2016/0203367 A1* | 7/2016 | Oami .................... G06T 7/0002 |
| | | 382/103 |

FOREIGN PATENT DOCUMENTS

| | | | | |
|---|---|---|---|---|
| JP | 2010-271923 A | 12/2010 | | |
| JP | 2012-59224 A | 3/2012 | | |
| JP | 2012-133445 A | 7/2012 | | |
| WO | WO-2007033286 A2 * | 3/2007 | ............... | G06K 9/52 |
| WO | WO 2013/001893 A1 | 1/2013 | | |

OTHER PUBLICATIONS

Dollár et al. "Fast Feature Pyramids for Object Detection", In PAMI, 2014, p. 1-14.

Marana et al. "Estimation of crowd density using image processing", In IEE Coltoquium on Image Processing for Security Applications, 2002, total 9 pages.

Pirsiavash et al. "Globally-Optimal Greedy Algorithms for Tracking a Variable Number of Objects", In CVPR, 2011, p. 1201-1208.

Szegedy et al. "Deep Neural Networks for Object Detection", In NIPS, 2013, p. 1-9.

Wang et al. "Learning Optimal Parameters For Multi-target Tracking", BMVC 2015, p. 1-13.

\* cited by examiner

| Condition Of Input Image | | Frame Rate | |
|---|---|---|---|
| | | □□□[fps] | ☆☆☆[fps] |
| Resolution | ○○○[ppi] | Color: Motion: Edge=5:3:3 | Color: Motion: Edge=8:2:2 |
| | △△△[ppi] | Color: Motion: Edge=5:4:3 | Color: Motion: Edge=9:3:2 |

FIG. 12 ical Field

The present invention relates to an object tracking device and an object tracking method for making a connection between objects present in different image frames.

BACKGROUND ART

In recent years, an object tracking device which tracks an object by detecting one or more objects present in each of image frames forming a time-series image and making a connection between objects present in a plurality of image frames is developed.

The object tracking device disclosed in following Patent Literature 1 has a function of automatically adjusting an object tracking parameter in order to prevent deterioration in object tracking accuracy even when an imaging device which takes a time-series image or an imaging environment of the time-series image changes.

In following Patent Literature 1, a change in resolution of the time-series image and a change in frame rate of the time-series image are assumed as changes of the imaging device.

Also, in following Patent Literature 1, a change in installation angle of the imaging device and a change in relative positional relationship between the imaging device and an object to be monitored are assumed as changes in the imaging environment.

CITATION LIST

Patent Literature

Patent Literature 1: JP 2012-59224 A

SUMMARY OF INVENTION

Technical Problem

Since the conventional object tracking device is configured as described above, it is possible to prevent deterioration in object tracking accuracy even when the imaging device which takes a time-series image or an imaging environment of the time-series image changes. However, at the time of making a connection between objects present in a plurality of image frames, all objects present in the image frames are made connection targets. Therefore, for example, even in a situation in which it is difficult to detect an object with high accuracy, such as a situation in which an object monitoring area is congested, an object detected by an object detecting process is made the connection target. Therefore, an object detected erroneously might be made the connection target, and in such a case, there is a problem in which the object tracking accuracy is deteriorated.

The present invention is achieved to solve the above-described problem, and an object thereof is to obtain an object tracking device and an object tracking method capable of preventing deterioration in object tracking accuracy even in a situation in which an object monitoring area is congested.

Solution to Problem

An object tracking device according to the present invention is provided with a processor to execute a program and a memory to store the program which, when executed by the processor, performs processes of, detecting, for image frames forming a time-series image, one or more objects present in each of the image frames, estimating, for each of the image frames, a congestion degree of an area in which each of the one or more objects detected is present, referring to an estimation result of the congestion degree for each of the image frames, and selecting an object present in an area the congestion degree of which is equal to or lower than a first threshold out of the one or more objects detected, calculating a feature amount of the object selected for each of the image frames, and making a connection between selected objects present in respective different image frames on the basis of the calculated feature amount of the object.

Advantageous Effects of Invention

According to the present invention, a congestion degree estimating unit which estimates, for each of image frames, a congestion degree of an area in which each of one or more objects detected by an object detecting unit is present is provided, and an object selecting unit refers to an estimation result of the congestion degree by the congestion degree estimating unit for each of the image frames and selects an object present in an area the congestion degree of which is equal to or lower than a first threshold out of the one or more objects detected by the object detecting unit. Thus, there is an effect of preventing deterioration in object tracking accuracy even in a situation in which an object monitoring area is congested.

BRIEF DESCRIPTION OF DRAWINGS

FIG. 3 is a hardware configuration diagram of a computer when the object tracking device in FIG. 1 is implemented by software, firmware, or the like.

FIG. 4 is a flowchart illustrating an object tracking method being a procedure when the object tracking device in FIG. 1 is implemented by the software, firmware, or the like.

DESCRIPTION OF EMBODIMENTS

Modes for carrying out the present invention are hereinafter described with reference to the attached drawings in order to describe the present invention in further detail.

First Embodiment

Figure 1:
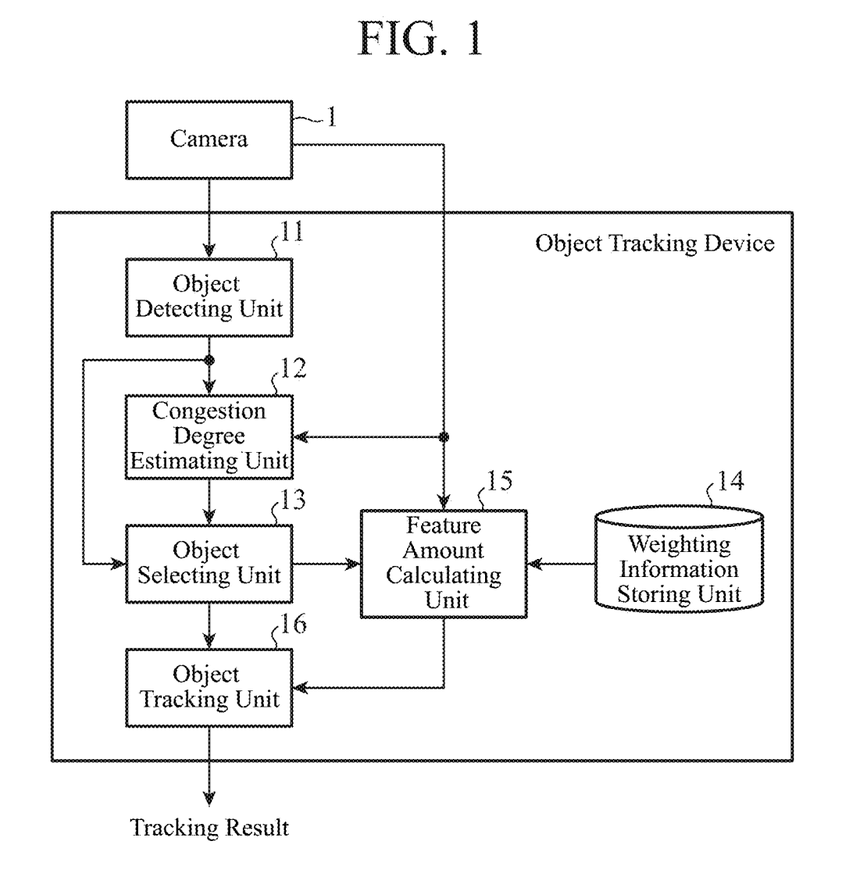
FIG. 1 is a configuration diagram illustrating an object tracking device according to a first embodiment of the present invention.
Figure 2:
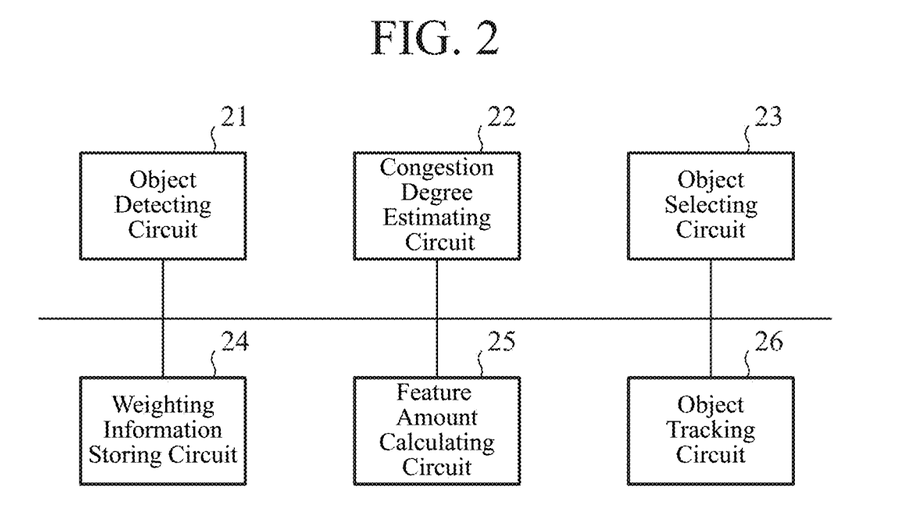
FIG. 2 is a hardware configuration diagram illustrating the object tracking device according to the first embodiment of the present invention.

FIG. 1 is a configuration diagram illustrating an object tracking device according to a first embodiment of the present invention, and FIG. 2 is a hardware configuration diagram illustrating the object tracking device according to the first embodiment of the present invention.

In FIGS. 1 and 2, a camera 1 being an imaging device which takes an image of a monitoring area takes a time-series image formed of a plurality of image frames and outputs the time-series image to the object tracking device.

The camera 1 also outputs image information indicating resolution of the time-series image and a frame rate of the time-series image to the object tracking device.

Although an image such as a moving image is considered as the time-series image formed of a plurality of image frames, this is not limited to the image such as the moving image and may be, for example, an image in which a plurality of still images is arranged in time series.

Although an example in which the imaging device is the camera 1 is herein illustrated, the imaging device is not limited to the camera 1 and may be, for example, a digital video recorder or the like.

It is also possible that a recording medium in which a time-series image formed of a plurality of image frames is recorded in advance is connected to the object tracking device in place of the camera 1 and the time-series image recorded in the recording medium is captured in the object tracking device.

An object detecting unit 11 is implemented by, for example, an object detecting circuit 21 illustrated in FIG. 2.

The object detecting unit 11 performs a process of obtaining the time-series image and the image information output from the camera 1.

The object detecting unit 11 also performs a process of detecting one or more objects present in each of the image frames forming the obtained time-series image.

The object detecting unit 11 also performs a process of calculating reliability indicating certainty of a detection result of the object.

A congestion degree estimating unit 12 is implemented by, for example, a congestion degree estimating circuit 22 illustrated in FIG. 2.

The congestion degree estimating unit 12 performs a process of estimating a congestion degree of an area in which each object detected by the object detecting unit 11 is present by analyzing the image of each image frame.

An object selecting unit 13 is implemented by, for example, an object selecting circuit 23 illustrated in FIG. 2.

The object selecting unit 13 performs a process of referring to an estimation result of the congestion degree by the congestion degree estimating unit 12 for each image frame, and selecting an object present in an area the congestion degree of which is equal to or lower than a reference congestion degree (first threshold) out of the one or more objects detected by the object detecting unit 11.

However, the object selecting unit 13 selects an object with the reliability of the detection result calculated by the object detecting unit 11 equal to or higher than reference reliability (second threshold) even if the object is present in an area the congestion degree of which is higher than the reference congestion degree.

A weighting information storing unit 14 is implemented by, for example, a weighting information storing circuit 24 illustrated in FIG. 2.

The weighting information storing unit 14 stores weighting information indicating weighting of a plurality of feature amounts for each combination of the resolution of the time-series image and the frame rate of the time-series image.

A feature amount calculating unit 15 is implemented by, for example, a feature amount calculating circuit 25 illustrated in FIG. 2.

The feature amount calculating unit 15 performs a process of specifying a combination coincident with a combination of the resolution and the frame rate of the time-series image indicated by the image information output from the camera 1 out of the combinations corresponding to a plurality of pieces of weighting information stored in the weighting information storing unit 14.

The feature amount calculating unit 15 also obtains the weighting information corresponding to the specified combination out of the plurality of pieces of weighting information stored in the weighting information storing unit 14.

The feature amount calculating unit 15 performs a process of calculating the feature amount of the object selected by the object selecting unit 13 on the basis of the obtained weighting information for each image frame.

An object tracking unit 16 is implemented by, for example, an object tracking circuit 26 illustrated in FIG. 2.

The object tracking unit 16 makes a connection between the objects present in different image frames selected by the object selecting unit 13 on the basis of the feature amount of each object calculated by the feature amount calculating unit 15.

In FIG. 1, it is assumed that each of the object detecting unit 11, the congestion degree estimating unit 12, the object selecting unit 13, the weighting information storing unit 14, the feature amount calculating unit 15, and the object tracking unit 16, which are components of the object tracking device, is implemented by dedicated hardware as illustrated in FIG. 2. In other words, it is assumed that they are implemented by the object detecting circuit 21, the congestion degree estimating circuit 22, the object selecting circuit 23, the weighting information storing circuit 24, the feature amount calculating circuit 25, and the object tracking circuit 26.

Herein, the weighting information storing circuit 24 corresponds to, for example, a non-volatile or volatile semiconductor memory, such as a random access memory (RAM), a read only memory (ROM), a flash memory, an erasable programmable read only memory (EPROM), and an electrically erasable programmable read only memory (EEPROM), a magnetic disc, a flexible disk, an optical disc, a compact disc, a mini disc, a digital versatile disc (DVD), or the like.

Also, each of the object detecting circuit 21, the congestion degree estimating circuit 22, the object selecting circuit 23, the feature amount calculating circuit 25, and the object tracking circuit 26 corresponds to, for example, a single circuit, a composite circuit, a programmed processor, a parallel-programmed processor, an application specific integrated circuit (ASIC), a field-programmable gate array (FPGA), or a combination of two or more thereof.

However, the components of the object tracking device are not limited to those implemented by the dedicated hardware, and the object tracking device may also be implemented by software, firmware, or a combination of software and firmware.

The software or the firmware is stored as a program in a memory of a computer. The computer is intended to mean the hardware which executes the program, and corresponds to, for example, a central processing unit (CPU), a central processor, a processing unit, an arithmetic unit, a microprocessor, a microcomputer, a processor, a digital signal processor (DSP), or the like.

Figure 3:
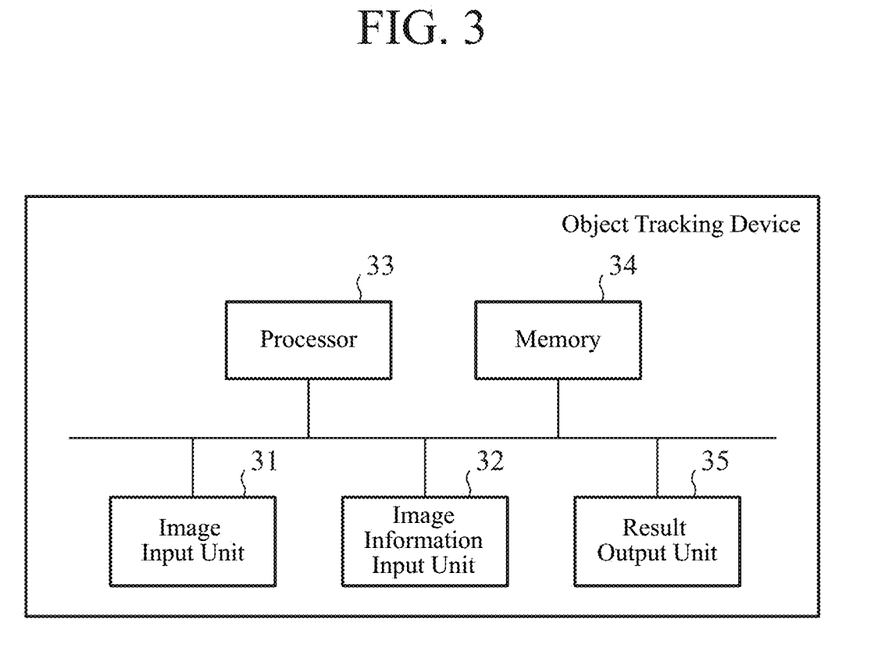

FIG. 3 is a hardware configuration diagram of the computer when the object tracking device in FIG. 1 is implemented by the software, the firmware, or the like.

In FIG. 3, an image input unit 31 being an interface device to the camera 1 obtains the time-series image output from the camera 1.

An image information input unit 32 being an interface device to the camera 1 obtains the image information output from the camera 1.

A processor 33 executes the program stored in a memory 34.

The memory 34 stores the program executed by the processor 33, the weighting information, and the like.

A result output unit 35 being, for example, an interface device to a display device and the like outputs a tracking result by the object tracking device and the like.

When the object tracking device in FIG. 1 is implemented by the software, the firmware, or the like, the weighting information storing unit 14 may be configured on the memory 34 of the computer and the program for causing the computer to execute procedures of the object detecting unit 11, the congestion degree estimating unit 12, the object selecting unit 13, the feature amount calculating unit 15, and the object tracking unit 16 may be stored in the memory 34, and the processor 33 of the computer may execute the program stored in the memory 34.

Figure 4:
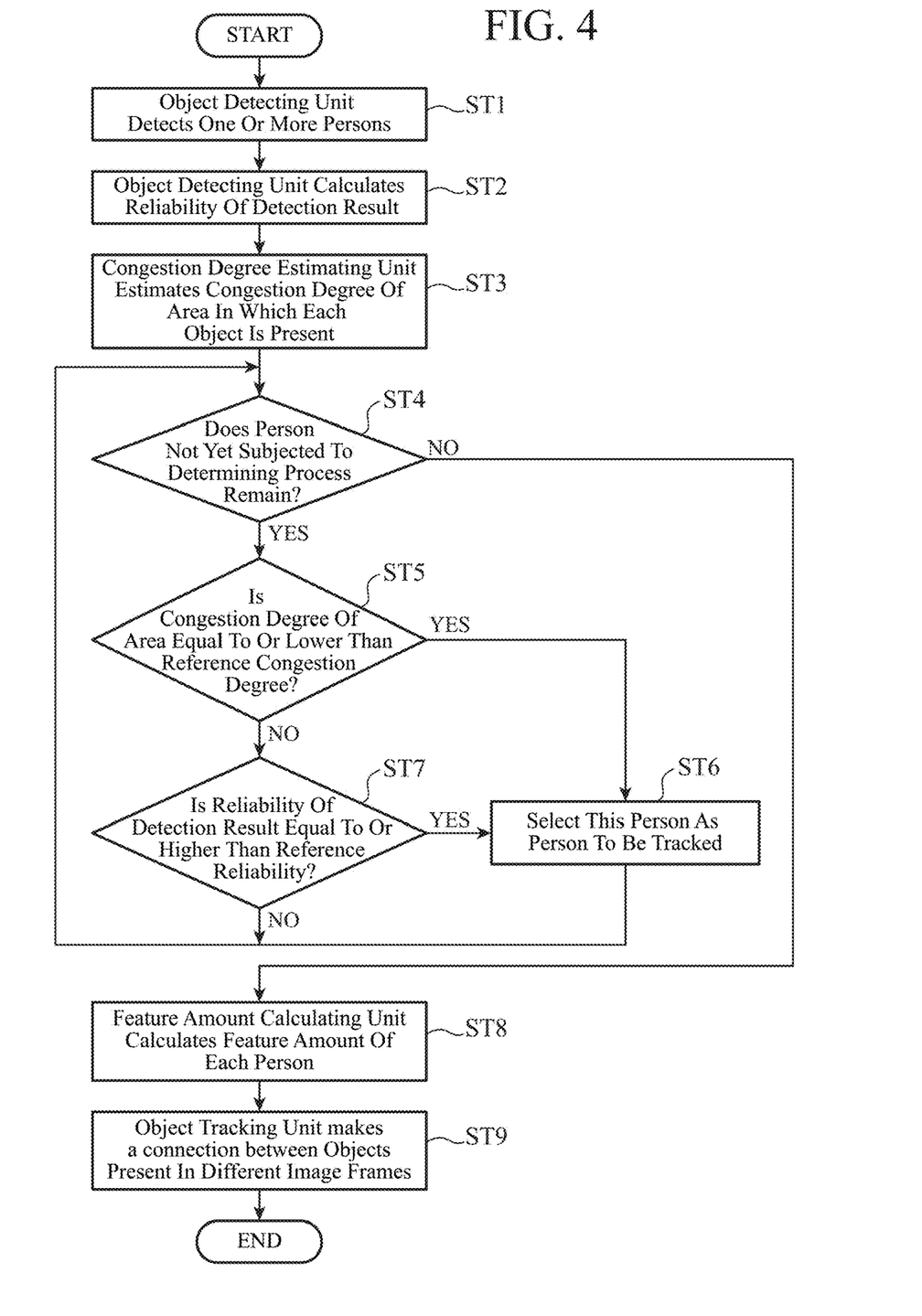

FIG. 4 is a flowchart illustrating an object tracking method being a procedure when the object tracking device in FIG. 1 is implemented by the software, the firmware, or the like.

The operation is next described.

In the first embodiment, an example is described in which a plurality of persons is present in an object monitoring area and an object tracking target is the plurality of persons present in the monitoring area.

However, it is sufficient that the object tracking target is an object present in the monitoring area, and this is not limited to a person. Therefore, for example, an object such as a vehicle, an animal, a robot, or the like may be the tracking target.

The camera 1 which takes an image of the monitoring area takes the time-series image formed of the plurality of image frames and outputs the time-series image to the object tracking device.

The camera 1 also outputs image information indicating resolution of the time-series image and a frame rate of the time-series image to the object tracking device.

When obtaining the time-series image output from the camera 1, the object detecting unit 11 detects one or more persons present in each of the image frames forming the time-series image (step ST1 in FIG. 4).

A process of detecting the person (object) present in the image frame is a known technology, so that the detailed description thereof is omitted; for example, the following detecting method can be used.

For example, it is possible to use a method including extracting a gradient direction of color and a gradient direction of luminance in the image frame as feature amounts (Aggregated Channel Features (ACF)), and detecting a person by an Adaptive Boosting (AdaBoost) classifier by using the ACF which represents the feature amounts. This detecting method is disclosed in the following Non-Patent Literature 1.

Non-Patent Literature 1

"Fast Feature Pyramids for Object Detection", In PAMI, 2014.

It is also possible to use a method including extracting a gradient of luminance as a feature amount (Histograms Of Oriented Gradients (HOG)) and detecting a person by a Support Vector Machine (SVM) identifier by using a SVM which is the feature amount. This detecting method is disclosed, for example, in the following Non-Patent Literature 2.

Non-Patent Literature 2

"Histograms of Oriented Gradients for Human Detection," In CVPR, 2005

Also, a method of detecting a person by using deep learning can be used. This detecting method is disclosed, for example, in the following Non-Patent Literature 3.

Non-Patent Literature 3

"Deep Neural Networks for Object Detection", In NIPS, 2013

When detecting the one or more persons present in the image frame, the object detecting unit 11 outputs a detection result of the person to the congestion degree estimating unit 12 and the object selecting unit 13.

The object detecting unit 11 outputs, as the detection result of the person, coordinate information indicating coordinates of an area in which the person is present in the image frame or coordinate information indicating coordinates of a rectangular area including the person present in the image frame.

As the coordinates of the area in which the person is present, for example, coordinates of an edge representing a shape of the person is considered.

In the first embodiment, the coordinates of the rectangular area including the person are also treated as the coordinates of the area in which the person is present.

Also, the object detecting unit 11 calculates reliability indicating certainty of the detection result of the person and outputs the calculated reliability to the object selecting unit 13 (step ST2 in FIG. 4).

The reliability indicating the certainty of the detection result indicates probability that the object detected by the object detecting unit 11 is a person. Thus, the value of the probability becomes larger as the probability that the object is a person is higher.

Since a method of calculating the reliability is a known technology, the detailed description thereof is omitted. The method of calculating the reliability is disclosed, for example, in the following Patent Literature 2.

[Patent Literature 2] JP 2012-133445 A

Figure 5:
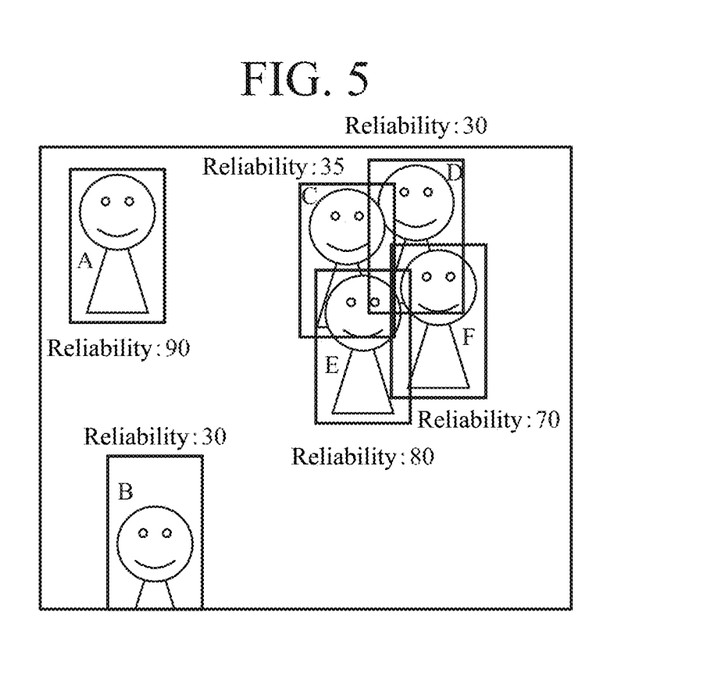
FIG. 5 is an explanatory view illustrating an example of a detection result of a person by an object detecting unit 11 and reliability thereof.

Herein, FIG. 5 is an explanatory view illustrating an example of the detection result of the person by the object detecting unit 11 and the reliability thereof.

FIG. 5 illustrates an example in which six persons are present in one image frame.

FIG. 5 illustrates the rectangular areas each including the person detected by the object detecting unit 11, and the reliability of the detection result of the person included in the rectangular area is illustrated around the corresponding rectangular area.

In FIG. 5, as reference signs for identifying the six persons detected by the object detecting unit 11, reference signs of A, B, C, D, E, and F are attached in the rectangular areas each including the person.

The congestion degree estimating unit 12 obtains the time-series image output from the camera 1 and the detection result by the object detecting unit 11.

The congestion degree estimating unit 12 estimates the congestion degree of the area in which each person detected by the object detecting unit 11 is present by analyzing the image of each of the image frames forming the time-series image (step ST3 in FIG. 4).

Since a method of estimating the congestion degree of the area is a known technology, the detailed description thereof is omitted. The method of estimating the congestion degree is disclosed, for example, in the following Non-Patent Literature 4.

Non-Patent Literature 4

"Estimation of Crowd Density using Image Processing" In IEE Colloquium on Image Processing for Security Applications, 2002.

Figure 6:
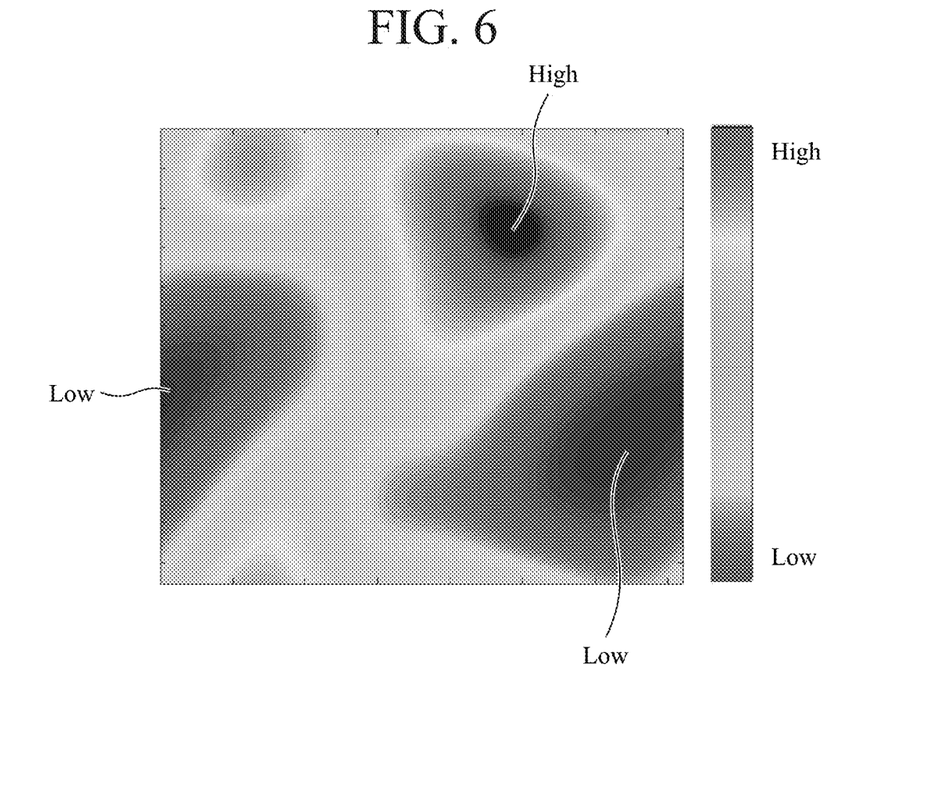
FIG. 6 is an explanatory view illustrating an example in which a congestion degree in an image frame is heat-mapped.

FIG. 6 is an explanatory view illustrating an example in which the congestion degree in the image frame is heat-mapped.

In FIG. 6, the number of persons per square meter (number of persons/m$^2$) is illustrated as the congestion degree.

The object selecting unit 13 refers to the estimation result of the congestion degree by the congestion degree estimating unit 12 for each image frame, and selects a person present in an area the congestion degree of which is equal to or lower than the reference congestion degree out of the one or more persons detected by the object detecting unit 11.

However, the object selecting unit 13 selects a person with the reliability of the detection result calculated by the object detecting unit 11 equal to or higher than the reference reliability even if the person is present in an area the congestion degree of which is higher than the reference congestion degree.

Hereinafter, a process of selecting a person by the object selecting unit 13 is specifically described.

The object selecting unit 13 refers to the estimation result of the congestion degree by the congestion degree estimating unit 12 for each image frame, and grasps the congestion degree of the area in which each person detected by the object detecting unit 11 is present.

Next, the object selecting unit 13 determines whether there remains a person not yet subjected to a process of determining whether this is a person to be tracked in the one or more persons detected by the object detecting unit 11 (step ST4 in FIG. 4). The determining process is a process at step ST5 or a process at step ST7.

When no person not yet subjected to the process of determining whether this is the person to be tracked remains (NO at step ST4 in FIG. 4), the object selecting unit 13 finishes the selecting process of the person by the object selecting unit 13 and the procedure proceeds to step ST8.

When there still remains the person not yet subjected to the process of determining whether this is the person to be tracked (YES at step ST4 in FIG. 4), the object selecting unit 13 determines, by comparing the congestion degree of the area in which the person not yet subjected to the determining process is present with the reference congestion degree set in advance, whether the congestion degree of the area in which the person is present is equal to or lower than the reference congestion degree (step ST5 in FIG. 4).

When the congestion degree of the area in which the person is present is equal to or lower than the reference congestion degree (YES at step ST5 in FIG. 4), the object selecting unit 13 selects the person as the person to be tracked (step ST6 in FIG. 4).

Figure 7:
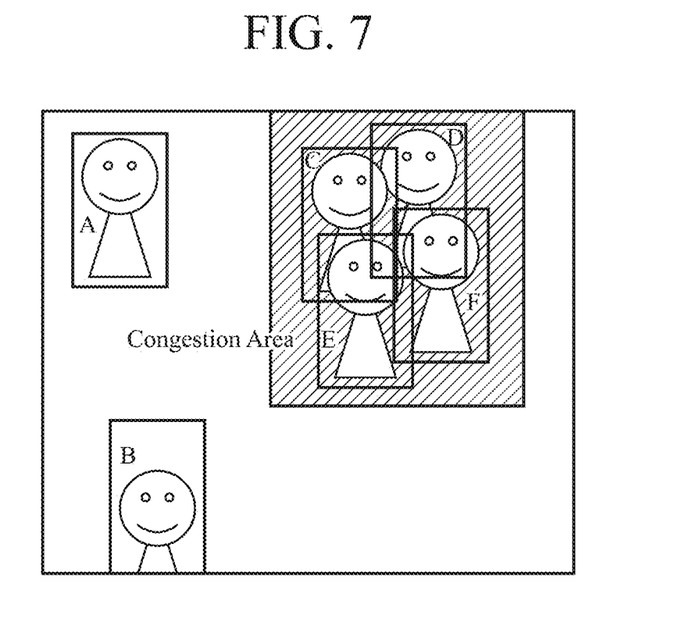
FIG. 7 is an explanatory view illustrating a selection result by an object selecting unit 13 based on the congestion degree.

FIG. 7 is an explanatory view illustrating a selection result by the object selecting unit 13 based on the congestion degree.

In an example in FIG. 7, an area the congestion degree of which is higher than the reference congestion degree is set as a congestion area, and the person C, the person D, the person E, and the person F are present in the congestion area.

Therefore, in the example in FIG. 7, the person A and the person B are selected as the persons to be tracked.

When the congestion degree of the area in which the person is present is higher than the reference congestion degree (NO at step ST5 in FIG. 4), the object selecting unit 13 determines, by comparing the reliability of the detection result of the person calculated by the object detecting unit 11 with the reference reliability set in advance, whether the reliability of the detection result of the person is equal to or higher than the reference reliability (step ST7 in FIG. 4).

When the reliability of the detection result of the person is equal to or higher than the reference reliability (YES at step ST7 in FIG. 4), the object selecting unit 13 selects the person as the person to be tracked (step ST6 in FIG. 4).

When the reliability of the detection result of the person is lower than the reference reliability (NO at step ST7 in FIG. 4), the object selecting unit 13 excludes the person from the person to be tracked.

The processes at steps ST4 to ST7 are repeated until the process of determining whether the person is the person to be tracked is finished for all the persons detected by the object detecting unit 11.

Figure 8:
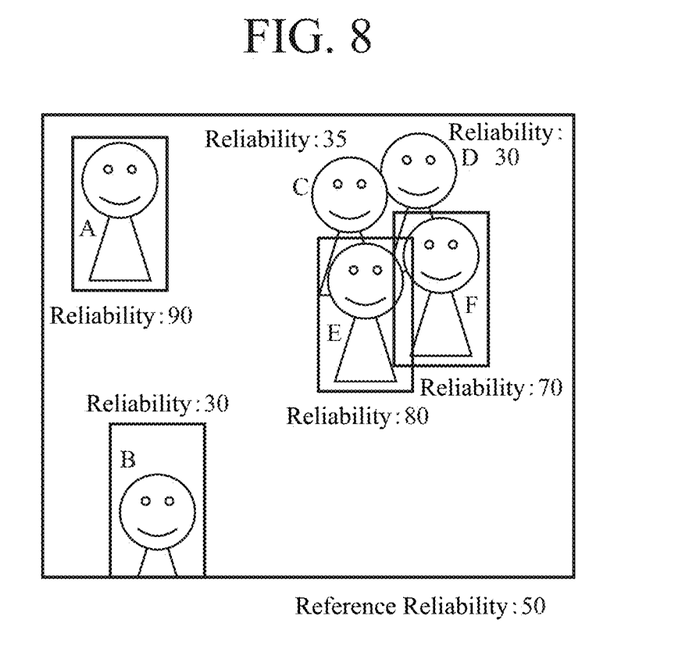
FIG. 8 is an explanatory view illustrating a selection result by the object selecting unit 13 based on reliability.

FIG. 8 is an explanatory view illustrating a selection result by the object selecting unit 13 based on the reliability.

FIG. 8 illustrates an example in which the reference reliability is 50.

Therefore, in the example in FIG. 8, although the person C, the person D, the person E, and the person F are present in the congestion area, the reliability of the detection results of the person E and the person F is equal to or higher than the reference reliability, so that the person E and the person F are selected as the persons to be tracked.

On the other hand, since the reliability of the detection results of the person C and the person D is lower than the reference reliability, the person C and the person D are excluded from the person to be tracked.

Note that although the reliability of the detection result of the person B is lower than the reference reliability, this is already selected as the person to be tracked on the basis of the congestion degree.

Therefore, the person A, the person B, the person E, and the person F are finally selected as the persons to be tracked.

The weighting information storing unit 14 stores the weighting information indicating the weighting of the plurality of feature amounts for each combination of the resolution of the time-series image and the frame rate of the time-series image.

Figure 9:
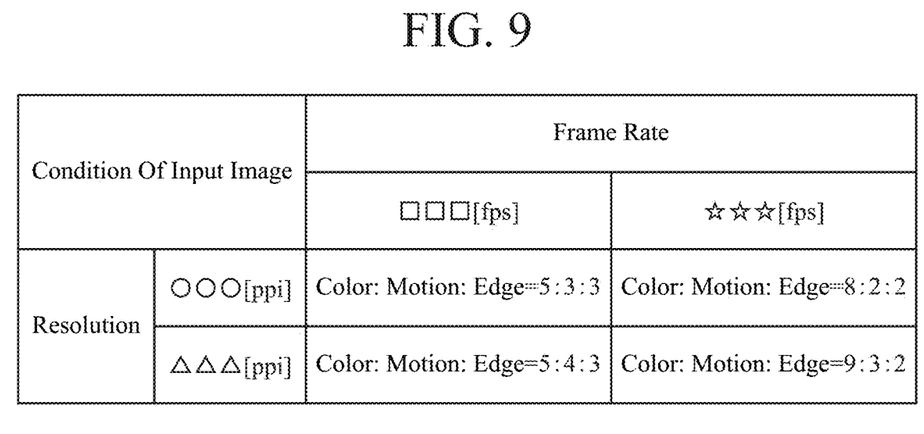
FIG. 9 is an explanatory table illustrating an example of weighting information for feature amounts corresponding to a combination of resolution of a time-series image and a frame rate of the time-series image.

FIG. 9 is an explanatory table illustrating an example of the weighting information for the feature amounts corresponding to the combination of the resolution of the time-series image and the frame rate of the time-series image.

FIG. 9 illustrates an example in which the feature amounts are "color", "motion", and "edge". The color represents a color of a person being an object, the motion represents motion of the person being the object, and the edge represents a shape of the person being the object.

FIG. 9 illustrates an example in which the resolution of the time-series image is ○○○[ppi] or ΔΔΔ [ppi], and the frame rate is □□□ [fps] or ☆☆☆ [fps]. Also, an example in which the resolution ○○○[ppi] is higher than the resolution ΔΔΔ [ppi], and the frame rate □□□ [fps] is higher than the frame rate ☆☆☆ [fps] is illustrated.

For example, it is illustrated that in the combination when the resolution of the time-series image is ○○○[ppi] and the frame rate of the time-series image is □□□ [fps], the weighting for the "color", "motion", and "edge" satisfies color: motion: edge=5:3:3.

In addition, it is illustrated that in the combination when the resolution of the time-series image is ΔΔΔ [ppi] and the frame rate of the time-series image is ☆☆☆ [fps], the weighting for the "color", "motion", and "edge" satisfies color: motion: edge=9:3:2.

Herein, an example is described in which the weighting information for the feature amounts corresponding to the resolution of the time-series image and the frame rate of the time-series image is stored in the weighting information storing unit 14, but there is no limitation.

For example, weighting information for the feature amounts corresponding to an installation angle of the camera 1 and a type of the object to be tracked may be stored in the weighting information storing unit 14.

Also, weighting information for the feature amounts corresponding to the installation angle of the camera 1 and the congestion degree in the time-series image may be stored in the weighting information storing unit 14.

The feature amount calculating unit 15 specifies the combination coincident with the combination of the resolution and the frame rate of the time-series image indicated by the image information output from the camera 1 out of the combinations corresponding to the plurality of pieces of weighting information stored in the weighting information storing unit 14.

Next, the feature amount calculating unit 15 obtains the weighting information corresponding to the specified combination out of the plurality of pieces of weighting information stored in the weighting information storing unit 14.

Next, the feature amount calculating unit 15 calculates, for each image frame, a feature amount P of each person selected by the object selecting unit 13 on the basis of the obtained weighting information (step ST8 in FIG. 4).

Hereinafter, a process of calculating the feature amount P of each person is briefly described.

The feature amount calculating unit 15 calculates, for example, a feature amount $P_1$ indicating the color of the person, a feature amount $P_2$ indicating the motion of the person, and a feature amount $P_3$ indicating the edge of the person as elements of the feature amount P of the person.

Since a method of calculating the feature amounts $P_1$, $P_2$, and $P_3$ is a known technology, the detailed description thereof is omitted.

When calculating the feature amount $P_1$ indicating the color of the person, the feature amount $P_2$ indicating the motion of the person, and the feature amount $P_3$ indicating the edge of the person, the feature amount calculating unit 15 performs weighting addition of the feature amounts $P_1$, $P_2$, and $P_3$ on the basis of the weighting information obtained from the weighting information storing unit 14.

The feature amount calculating unit 15 outputs a result of the weighting addition of the feature amounts $P_1$, $P_2$, and $P_3$ to the object tracking unit 16 as a final feature amount P.

For example, when the resolution of the time-series image is ΔΔΔ [ppi] and the frame rate of the time-series image is □□□ [fps], the feature amount calculating unit 15 obtains color: motion: edge=5:4:3 as the weighting information for "color", "motion", and "edge".

In this case, the feature amount calculating unit 15 calculates the feature amount P as represented by the following equation (1), for example, by using this weighting information.

$$P = \frac{P_1 \times 5 + P_2 \times 4 + P_3 \times 3}{(5+4+3)} \tag{1}$$

When receiving the feature amount P of each person selected by the object selecting unit 13 from the feature amount calculating unit 15, the object tracking unit 16 makes a connection between the persons present in different image frames selected by the object selecting unit 13 on the basis of the feature amount P of each person (step ST9 in FIG. 4).

The object tracking unit 16 outputs a connection result between the persons present in the different image frames as a person tracking result.

As a method of making a connection between the persons present in the different image frames, for example, a method disclosed in the following Non-Patent Literature 5 can be used.

Non-Patent Literature 5

"Globally-Optimal Greedy Algorithms for Tracking a Variable Number of Objects" In CVPR, 2011.

To make a connection between the persons is to make a connection between the persons with similar feature amounts; an example of making a connection between the persons is hereinafter briefly described.

For example, assume that persons present in an image frame (1) are a person A, a person B, a person E, and a person F, and persons present in an image frame (2) are a person A', a person B', a person E', and a person F'.

At that time, assume that a feature amount of the person A present in the image frame (1) is $P_A=30$, a feature amount of the person B is $P_B=40$, a feature amount of the person E is $P_E=50$, and a feature amount of the person F is $P_F=60$.

Also, assume that a feature amount of the person A' present in the image frame (2) is $P_A'=32$, a feature amount of the person B' is $P_B'=42$, a feature amount of the person E' is $P_E'=48$, and a feature amount of the person F' is $P_F'=67$.

Furthermore, assume that a maximum difference in feature amount between two image frames in which a connection can be made is three.

In this case, the feature amount $P_A'=32$ of the person A' is the closest to the feature amount $P_A=30$ of the person A present in the image frame (1) among the feature amounts of the four persons present in the image frame (2). In addition, a difference between the feature amount $P_A=30$ of the person A and the feature amount $P_A'=32$ of the person A' is two, and the difference is smaller than three, which is the maximum difference in feature amount. Therefore, it is possible to make a connection between the person A present in the image frame (1) and the person A' present in the image frame (2).

The feature amount $P_B'=42$ of the person B' is the closest to the feature amount $P_B=40$ of the person B present in the image frame (1) among the feature amounts of the four persons present in the image frame (2). In addition, a difference between the feature amount $P_B=40$ of the person B and the feature amount $P_B'=42$ of the person B' is two, and the difference is smaller than three, which is the maximum difference in feature amount. Therefore, it is possible to make a connection between the person B present in the image frame (1) and the person B' present in the image frame (2).

The feature amount $P_E'=48$ of the person E' is the closest to the feature amount $P_E=50$ of the person E present in the image frame (1) among the feature amounts of the four persons present in the image frame (2). In addition, a difference between the feature amount $P_E=50$ of the person E and the feature amount $P_E'=48$ of the person E' is two, and the difference is smaller than three, which is the maximum difference in feature amount. Therefore, it is possible to make a connection between the person E present in the image frame (1) and the person E' present in the image frame (2).

The feature amount $P_F'=67$ of the person F' is the closest to the feature amount $P_F=60$ of the person F present in the image frame (1) among the feature amounts of the four persons present in the image frame (2).

However, a difference between the feature amount $P_F=60$ of the person F and the feature amount $P_F'=67$ of the person F' is seven, and this difference is larger than three, which is the maximum difference in feature amount. Therefore, the person F present in the image frame (1) cannot make a connection with any person present in the image frame (2).

Also, the person F' present in the image frame (2) cannot make a connection with any person present in the image frame (1).

Herein, an example is described in which the feature amount of the person A present in the image frame (1) is $P_A=30$; for example, when the feature amount of the person A present in the image frame (1) is $P_A=37$, among the feature amounts of the four persons present in the image frame (2), the feature amount $P_A'=32$ of the person A' and the feature amount $P_B'=42$ of person B' are the closest.

However, a difference between the feature amount $P_A=37$ of the person A and the feature amount $P_A'=32$ of the person A' is five, and the difference is larger than three, which is the maximum difference in feature amount. Furthermore, a difference between the feature amount $P_A=37$ of the person A and the feature amount $P_B'=42$ of the person B' is five, and the difference is larger than three, which is the maximum difference in feature amount.

Therefore, the person A present in the image frame (1) cannot make a connection with any person present in the image frame (2).

As is apparent from above, according to the first embodiment, the congestion degree estimating unit 12 which estimates, for each image frame, the congestion degree of the area in which each object detected by the object detecting unit 11 is present is provided, and the object selecting unit 13 refers to the estimation result of the congestion degree by the congestion degree estimating unit 12 for each image frame and selects the object present in the area the congestion degree of which is equal to or lower than the first threshold out of the one or more objects detected by the object detecting unit 11. Thus, there is an effect of preventing deterioration in object tracking accuracy even in a situation in which the object monitoring area is congested.

Also, according to the first embodiment, even when an object is present in an area the congestion degree of which is larger than the first threshold, the object selecting unit 13 selects the object with the reliability of the detection result calculated by the object detecting unit 11 equal to or larger than the second threshold. Thus, there is an effect of increasing the number of objects which can be tracked without deterioration in object tracking accuracy.

In the first embodiment, an example is described in which the object detecting unit 11 calculates the reliability indicating the certainty of the detection result of each object. Alternatively, the object selecting unit 13 may calculate the reliability indicating the certainty of the detection result of each object by the object detecting unit 11.

Second Embodiment

In the above-described first embodiment, an example is described in which the feature amount calculating unit 15 obtains the weighting information corresponding to the combination coincident with the combination of the resolution and the frame rate indicated by the image information output from the camera 1 out of the pieces of weighting information corresponding to the plurality of combinations stored in the weighting information storing unit 14.

However, there also is a case in which the weighting information storing unit 14 does not store the weighting information corresponding to the combination coincident with the combination of the resolution and the frame rate indicated by the image information output from the camera 1.

In a second embodiment, an example is described in which a feature amount calculating unit 15 can obtain appropriate weighting information out of a plurality of pieces of weighting information stored in a weighting information storing unit 14 even when weighting information corresponding to a combination coincident with a combination of resolution and a frame rate indicated by image information output from a camera 1 is not stored.

Figure 10:
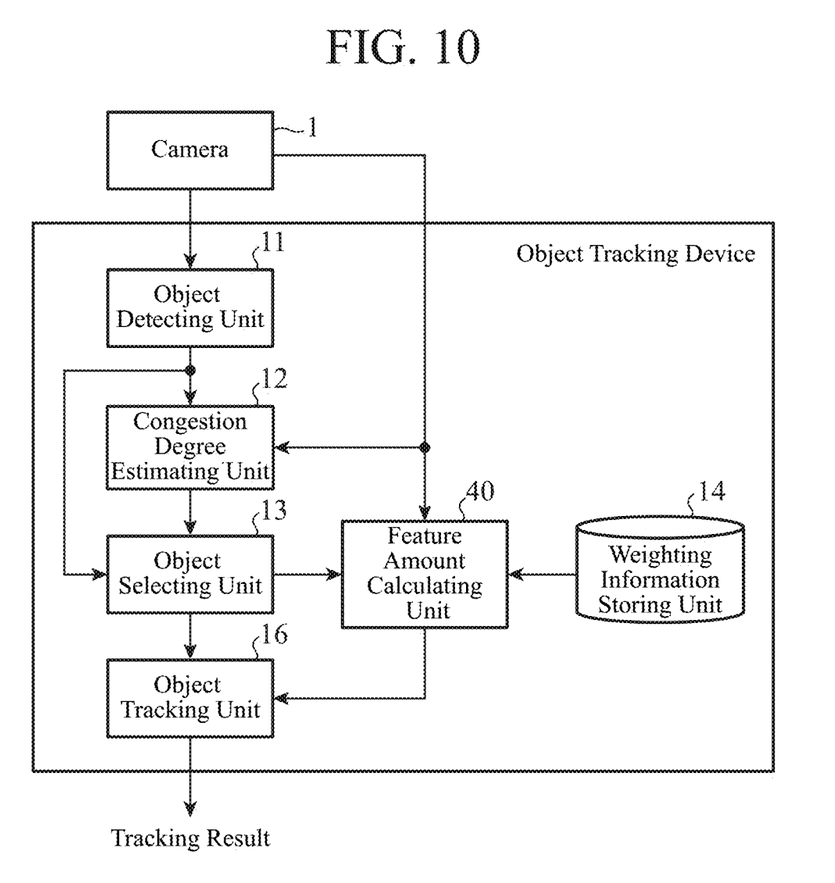
FIG. 10 is a configuration diagram illustrating an object tracking device according to a second embodiment of the present invention.
Figure 11:
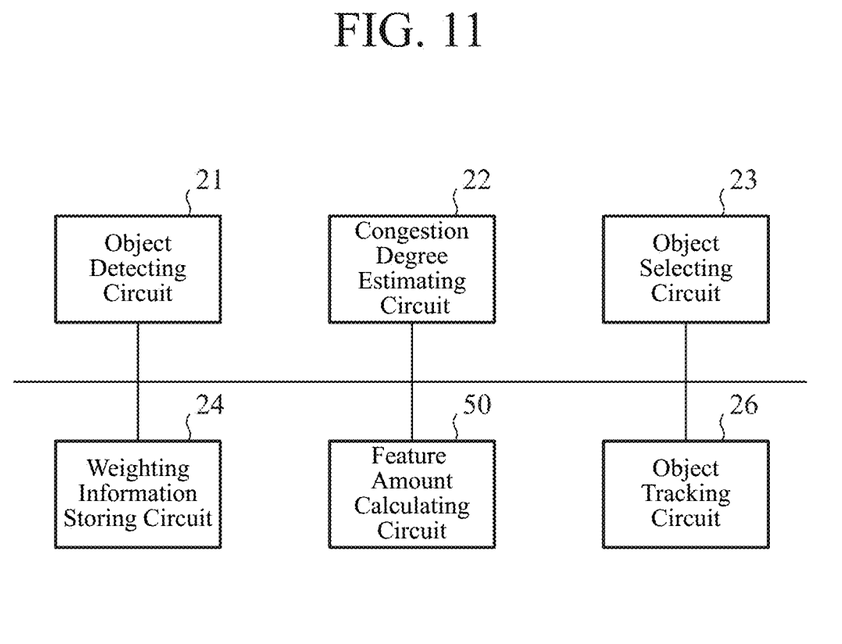
FIG. 11 is a hardware configuration diagram illustrating the object tracking device according to the second embodiment of the present invention.

FIG. 10 is a configuration diagram illustrating an object tracking device according to the second embodiment of the present invention, and FIG. 11 is a hardware configuration diagram illustrating the object tracking device according to the second embodiment of the present invention.

In FIGS. 10 and 11, the same reference signs as those in FIGS. 1 and 2 represent the same or corresponding parts, so that the description thereof is not repeated.

A feature amount calculating unit 40 is implemented by, for example, a feature amount calculating circuit 50 illustrated in FIG. 11.

The feature amount calculating unit 40 performs a process of determining whether there is a combination coincident with a combination of resolution of a time-series image provided to an object detecting unit 11 and a frame rate of the time-series image provided to the object detecting unit 11 in combinations corresponding to the plurality of pieces of weighting information stored in the weighting information storing unit 14.

In other words, the feature amount calculating unit 40 performs a process of determining whether there is a combination coincident with the combination of the resolution and the frame rate indicated by the image information output from the camera 1 in the combinations corresponding to the plurality of pieces of weighting information stored in the weighting information storing unit 14.

When determining that there is the coincident combination, the feature amount calculating unit 40 performs a process of obtaining the weighting information corresponding to the coincident combination from the weighting information storing unit 14.

When determining that there is no coincident combination, the feature amount calculating unit 40 performs a process of calculating similarity between the resolution and the frame rate in each of the combinations corresponding to the plurality of pieces of weighting information stored in the weighting information storing unit 14 and the resolution and the frame rate indicated by the image information output from the camera 1.

The feature amount calculating unit 40 performs a process of obtaining one piece of weighting information out of the plurality of pieces of weighting information stored in the weighting information storing unit 14 on the basis of the calculated similarity.

Like the feature amount calculating unit 15 in FIG. 1, the feature amount calculating unit 40 performs a process of calculating a feature amount of the person selected by an object selecting unit 13 on the basis of the obtained weighting information for each image frame.

In FIG. 10, it is assumed that each of the object detecting unit 11, a congestion degree estimating unit 12, the object selecting unit 13, the weighting information storing unit 14, the feature amount calculating unit 40, and an object tracking unit 16, which are components of the object tracking device, is implemented by dedicated hardware as illustrated in FIG. 11. In other words, it is assumed that they are implemented by an object detecting circuit 21, a congestion degree estimating circuit 22, an object selecting circuit 23, a weighting information storing circuit 24, the feature amount calculating circuit 50, and an object tracking circuit 26.

Each of the object detecting circuit 21, the congestion degree estimating circuit 22, the object selecting circuit 23, the feature amount calculating circuit 50, and the object tracking circuit 26 corresponds to, for example, a single circuit, a composite circuit, a programmed processor, a parallel-programmed processor, an ASIC, an FPGA, or a combination of two or more thereof.

However, the components of the object tracking device are not limited to those implemented by the dedicated hardware, and the object tracking device may also be implemented by software, firmware, or a combination of software and firmware.

When the object tracking device in FIG. 10 is implemented by the software, the firmware, or the like, the weighting information storing unit 14 may be configured on a memory 34 of a computer illustrated in FIG. 3 and a program for causing the computer to execute procedures of the object detecting unit 11, the congestion degree estimating unit 12, the object selecting unit 13, the feature amount calculating unit 40, and the object tracking unit 16 may be stored in the memory 34, and a processor 33 of the computer may execute the program stored in the memory 34.

The operation is next described.

Except for the feature amount calculating unit 40, processes are similar to those in the above-described first embodiment, so that only a process in the feature amount calculating unit 40 is hereinafter described with reference to FIG. 12.

Figure 12:
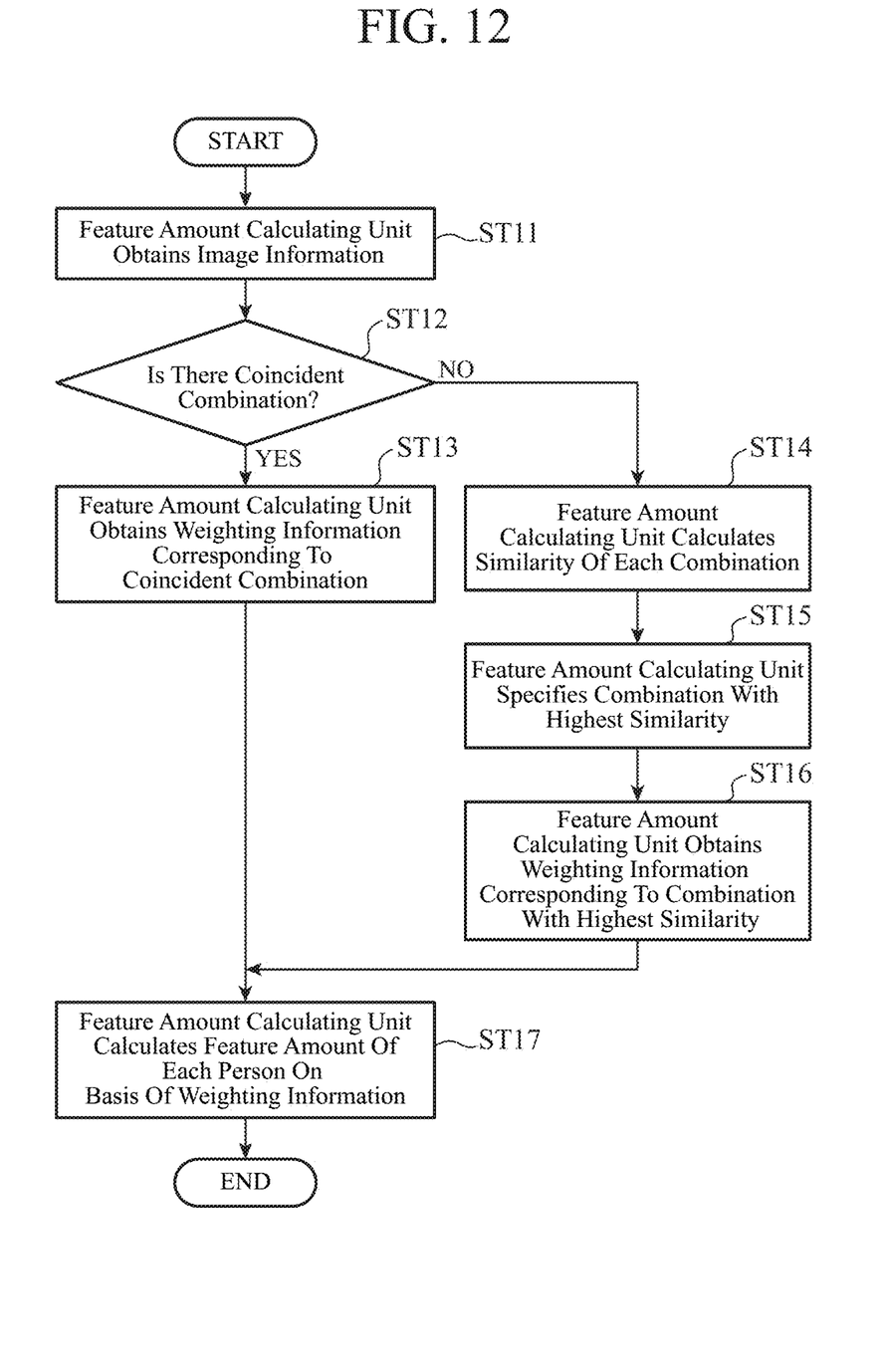
FIG. 12 is a flowchart illustrating a process in a feature amount calculating unit 40 of the object tracking device according to the second embodiment of the present invention.

FIG. 12 is a flowchart illustrating the process in the feature amount calculating unit 40 of the object tracking device according to the second embodiment of the present invention.

The feature amount calculating unit 40 obtains the image information output from the camera 1 (step ST11 in FIG. 12).

The feature amount calculating unit 40 determines whether there is a combination coincident with a combination of the resolution and the frame rate indicated by the obtained image information in the combinations corresponding to the plurality of pieces of weighting information stored in the weighting information storing unit 14 (step ST12 in FIG. 12).

In the example in FIG. 9, as the combinations of the resolution and the frame rate of the time-series image, there are four combinations in which the resolution is ○○○[ppi] or △△△ [ppi], and the frame rate is □□□ [fps] or ☆☆☆ [fps].

Therefore, in the example in FIG. 9, when the resolution indicated by the obtained image information is ○○○[ppi] or △△△ [ppi], and the frame rate indicated by the obtained image information is □□□ [fps] or ☆☆☆ [fps], the feature amount calculating unit 40 determines that there is the coincident combination.

When determining that there is the coincident combination (YES at step ST12 in FIG. 12), the feature amount calculating unit 40 obtains the weighting information corresponding to the coincident combination from the weighting information storing unit 14 (step ST13 in FIG. 12).

When determining that there is no coincident combination (NO at step ST12 in FIG. 12), the feature amount calculating unit 40 calculates similarity between the resolution and the frame rate in each of the combinations corresponding to the plurality of pieces of weighting information stored in the weighting information storing unit 14 and the resolution and the frame rate indicated by the obtained image information (step ST14 in FIG. 12).

Although a method of calculating the similarity by the feature amount calculating unit 40 is not especially limited, for example, the similarity is calculated as follows.

Herein, for convenience of description, it is assumed that the resolution indicated by the obtained image information is a, and the frame rate indicated by the obtained image information is b.

Also, it is assumed that the resolution ○○○[ppi] is $a_1$, the resolution △△△ [ppi] is $a_2$, the frame rate □□□ [fps] is $b_1$, and the frame rate ☆☆☆ [fps] is $b_2$.

Also, it is assumed that a combination of the resolution ○○○[ppi] and the frame rate □□□ [fps] is a combination (1), a combination of the resolution ○○○[ppi] and the frame rate ☆☆☆ [fps] is a combination (2), a combination of the resolution △△△ [ppi] and the frame rate □□□ [fps] is a combination (3), and a combination of the resolution △△△ [ppi] and the frame rate ☆☆☆ [fps] is a combination (4).

The feature amount calculating unit 40 calculates a difference $\Delta a_1$ between the resolution a indicated by the obtained image information and the resolution $a_1$ as represented by the following equation (2), and also calculates a difference $\Delta a_2$ between the resolution a indicated by the obtained image information and the resolution $a_2$ as represented by the following equation (3).

$$\Delta a_1 = |a - a_1| \quad (2)$$

$$\Delta a_2 = |a - a_2| \quad (3)$$

The feature amount calculating unit 40 also calculates a difference $\Delta b_1$ between the frame rate b indicated by the obtained image information and the frame rate $b_1$ as represented by the following equation (4), and also calculates a difference $\Delta b_2$ between the frame rate b indicated by the obtained image information and the frame rate $b_2$ as represented by the following equation (5).

$$\Delta b_1 = |b - b_1| \quad (4)$$

$$\Delta b_2 = |b - b_2| \quad (5)$$

The feature amount calculating unit 40 calculates similarity $R_1$ between the resolution $a_1$ and the frame rate $b_1$ in the combination (1) and the resolution a and the frame rate b indicated by the obtained image information as represented by the following equation (6). In equation (6), G represents a constant.

$$R_1 = \frac{G}{\Delta a_1 + \Delta b_1} \quad (6)$$

The feature amount calculating unit 40 calculates similarity $R_2$ between the resolution $a_1$ and the frame rate $b_2$ in the combination (2) and the resolution a and the frame rate b indicated by the obtained image information as represented by the following equation (7).

$$R_2 = \frac{G}{\Delta a_1 + \Delta b_2} \quad (7)$$

The feature amount calculating unit 40 calculates similarity $R_3$ between the resolution $a_2$ and the frame rate $b_1$ in the combination (3) and the resolution a and the frame rate b indicated by the obtained image information as represented by the following equation (8).

$$R_3 = \frac{G}{\Delta a_2 + \Delta b_1} \quad (8)$$

The feature amount calculating unit 40 calculates similarity $R_4$ between the resolution $a_2$ and the frame rate $b_2$ in the combination (4) and the resolution a and the frame rate b indicated by the obtained image information as represented by the following equation (9).

$$R_4 = \frac{G}{\Delta a_2 + \Delta b_2} \quad (9)$$

Herein, although an example is described in which the similarity R is calculated without weighting the difference $\Delta a$ in resolution and the difference $\Delta b$ in frame rate, for example, as represented by the following equation (10), it is also possible to calculate the similarity R by weighting the difference $\Delta a$ in resolution and the difference $\Delta b$ in frame rate. Equation (10) represents an example of calculating the similarity $R_1$ for the combination (1), in which $w_a$ represents a weighting coefficient for the difference $\Delta a_1$, and $w_b$ represents a weighting coefficient for the difference $\Delta b_1$. Note that $w_a$ and $w_b$ are values between 0 and 1.

$$R_1 = \frac{G}{\Delta a_1 \times w_a + \Delta b_1 \times w_b} \quad (10)$$

After calculating the similarities R for all the combinations, the feature amount calculating unit 40 compares the similarities R for all the combinations, and specifies the combination with the highest similarity (step ST15 in FIG. 12).

The feature amount calculating unit 40 obtains the weighting information corresponding to the combination with the highest similarity out of the plurality of pieces of weighting information stored in the weighting information storing unit 14 (step ST16 in FIG. 12).

For example, among the combinations (1) to (4), when the combination with the highest similarity is the combination (1), the weighting information indicating that the weights for "color", "motion", and "edge" satisfy color:motion:edge=5:3:3 is obtained.

Also, when the combination with the highest similarity is the combination (2), the weighting information indicating that the weights for "color", "motion", and "edge" satisfy color:motion:edge=8:2:2 is obtained.

When obtaining the weighting information, as in the feature amount calculating unit 15 in FIG. 1, the feature amount calculating unit 40 calculates the feature amount of the person selected by the object selecting unit 13 on the basis of the obtained weighting information for each image frame (step ST17 in FIG. 12).

As is apparent from above, according to the second embodiment, when there is no combination coincident with the combination of the resolution of the time-series image provided to the object detecting unit 11 and the frame rate of the time-series image provided to the object detecting unit 11 in the combinations corresponding to the plurality of pieces of weighting information stored in the weighting information storing unit 14, the feature amount calculating unit 40 calculates the similarity between the resolution and the frame rate in each of the combinations corresponding to the plurality of pieces of weighting information stored in the weighting information storing unit 14 and the resolution of the time-series image provided to the object detecting unit 11 and the frame rate of the time-series image provided to the object detecting unit 11. Then, the feature amount calculating unit 40 obtains one piece of weighting information from among the plurality of pieces of weighting information stored in the weighting information storing unit 14 on the basis of the calculated similarity, and calculates the feature amount of each object selected by the object selecting unit 13 on the basis of the obtained weighting information. As a result, it is possible to obtain appropriate weighting information even when the weighting information corresponding to the combination coincident with the combination of the resolution and the frame rate of the time-series image provided to the object detecting unit 11 is not stored in the weighting information storing unit 14.

Note that, in the invention of the present application, the embodiments may be freely combined, any component of each embodiment may be modified, or any component may be omitted in each embodiment without departing from the scope of the invention.

INDUSTRIAL APPLICABILITY

The present invention is suitable for an object tracking device and an object tracking method for making a connection between objects present in different image frames.

REFERENCE SIGNS LIST

1: Camera, 11: Object detecting unit, 12: Congestion degree estimating unit, 13: Object selecting unit, 14: Weighting information storing unit, 15: Feature amount calculating unit, 16: Object tracking unit, 21: Object detecting circuit, 22: Congestion degree estimating circuit, 23: Object selecting circuit, 24: Weighting information storing circuit, 25: Feature amount calculating circuit, 26: Object tracking circuit, 31: Image input unit, 32: Image information input unit, 33: Processor, 34: Memory, 35: Result output unit, 40: Feature amount calculating unit, and 50: Feature amount calculating circuit.

The invention claimed is:

1. An object tracking device comprising:
a processor to execute a program; and
a memory to store the program which, when executed by the processor, performs processes of,
detecting, for image frames forming a time-series image, one or more objects present in each of the image frames;
estimating, for each of the image frames, a congestion degree of an area in which each of the one or more objects detected is present;
referring to an estimation result of the congestion degree for each of the image frames, and selecting an object present in an area the congestion degree of which is equal to or lower than a first threshold out of the one or more objects detected;
calculating a feature amount of the object selected for each of the image frames; and
making a connection between selected objects present in respective different image frames on a basis of the calculated feature amount of the object,
wherein the feature amount of the object includes a plurality of feature amounts,
the object tracking device includes a weighting information memory to store weighting information for the plurality of feature amounts,
the feature amount of the object selected is calculated on a basis of the weighting information stored in the weighting information memory, and
the weighting information memory stores a table which shows a plurality of pieces of weighting information for respective combinations of resolution and a frame rate of a time-series image, the combinations including a first combination of first resolution and a first frame rate and a second combination of second resolution different from the first resolution and a second frame rate different from the first frame rate.

2. The object tracking device according to claim 1,
wherein the processes further include calculating, for the one or more objects present in each of the image frames, reliability indicating certainty of a detection result of each of the one or more objects, and
even when an object is present in an area the congestion degree of which is larger than the first threshold, selecting the object with the calculated reliability of the detection result equal to or larger than a second threshold.

3. The object tracking device according to claim 1,
wherein the processes further include calculating reliability indicating certainty of a detection result of each of the one or more objects, and selecting, even when an object is present in an area the congestion degree of which is larger than the first threshold, the object with the calculated reliability equal to or larger than a second threshold.

4. An object tracking device comprising:
a processor to execute a program; and
a memory to store the program which, when executed by the processor, performs processes of,
detecting, for image frames forming a time-series image, one or more objects present in each of the image frames;
estimating, for each of the image frames, a congestion degree of an area in which each of the one or more objects detected is present;
referring to an estimation result of the congestion degree for each of the image frames, and selecting an object present in an area the congestion degree of which is equal to or lower than a first threshold out of the one or more objects detected;
calculating a feature amount of the object selected for each of the image frames; and
making a connection between selected objects present in respective different image frames on a basis of the calculated feature amount of the object, wherein
the feature amount of the object includes a plurality of feature amounts,
the object tracking device includes a weighting information memory to store weighting information for the plurality of feature amounts,
the feature amount of the object selected is calculated on a basis of the weighting information stored in the weighting information memory,
the weighting information memory stores a plurality of pieces of weighting information for respective combinations of resolution and a frame rate of a time-series image, and
the processes further include calculating, when there is no combination coincident with a combination of resolution and a frame rate of the time-series image provided to the object tracking device in the combinations corresponding to the respective plurality of pieces of weighting information stored in the weighting information memory, similarity between the resolution and frame rate in each of the combinations corresponding to the respective plurality of pieces of weighting information stored in the weighting information memory and the resolution and frame rate of the time-series image provided to the object tracking device, obtaining one piece of weighting information from the plurality of pieces of weighting information stored in the weighting information memory on a basis of the similarity, and calculating the feature amount of the object selected on a basis of the obtained weighting information.

5. An object tracking method comprising:
detecting, for image frames forming a time-series image, one or more objects present in each of the image frames;
estimating, for each of the image frames, a congestion degree of an area in which each of the one or more objects detected is present;
referring to an estimation result of the congestion degree for each of the image frames, and selecting an object present in an area the congestion degree of which is equal to or lower than a first threshold out of the one or more objects detected;

calculating a feature amount of the object selected for each of the image frames; and making a connection between selected objects present in respective different image frames on a basis of the calculated feature amount of the object, wherein the feature amount of the object includes a plurality of feature amounts, the object tracking method includes storing weighting information for the plurality of feature amounts in a weighting information memory, the feature amount of the object selected is calculated on a basis of the stored weighting information, and the weighting information memory stores a table which shows a plurality of pieces of weighting information for respective combinations of resolution and a frame rate of a time-series image, the combinations including a first combination of first resolution and a first frame rate and a second combination of second resolution different from the first resolution and a second frame rate different from the first frame rate.

* * * * *